United States Patent [19]

Hudson et al.

[11] 3,998,927
[45] Dec. 21, 1976

[54] RECOVERY OF SODIUM ALUMINATE FROM HIGH-SILICA ALUMINOUS MATERIALS

[75] Inventors: Lawrence Keith Hudson, Oakmont, Pa.; Thomas G. Swansiger, St. Louis, Mo.

[73] Assignee: Aluminum Company of America, Pittsburgh, Pa.

[22] Filed: Oct. 20, 1975

[21] Appl. No.: 623,930

[52] U.S. Cl. .............................. 423/119; 423/122; 423/131; 23/301; 23/302 R; 23/305 A; 423/600
[51] Int. Cl.$^2$ .......................................... C01F 7/06
[58] Field of Search .................: 423/119, 131, 122; 23/305 A, 302 R, 301 R

[56] References Cited
FOREIGN PATENTS OR APPLICATIONS 108,917  3/1954  U.S.S.R. ............................ 423/119

OTHER PUBLICATIONS

Ponomarev et al., "Tavetuge Metally", 1957, pp. 45-51.

*Primary Examiner*—Herbert T. Carter
*Attorney, Agent, or Firm*—John P. Taylor

[57] ABSTRACT

An improved process is provided for the recovery of sodium aluminate crystallized from a digest of caustic and lime with high-silica aluminous materials. The digest solution is concentrated by evaporation and then seeded with $Na_2Al_2O_4 \cdot 2.5H_2O$ crystals to crystallize alumina from the solution as $Na_2Al_2O_4 \cdot 2.5H_2O$. The crystals are then separated from the mother liquor solution by filtration or centrifugation. The crystals are then washed with a solution having a lower caustic content than the mother liquor and an alumina concentration of about 50 grams per liter to remove any mother liquor remaining on the crystals. The sodium aluminate crystals are used as a feed for a subsequent Bayer processing step.

5 Claims, 2 Drawing Figures

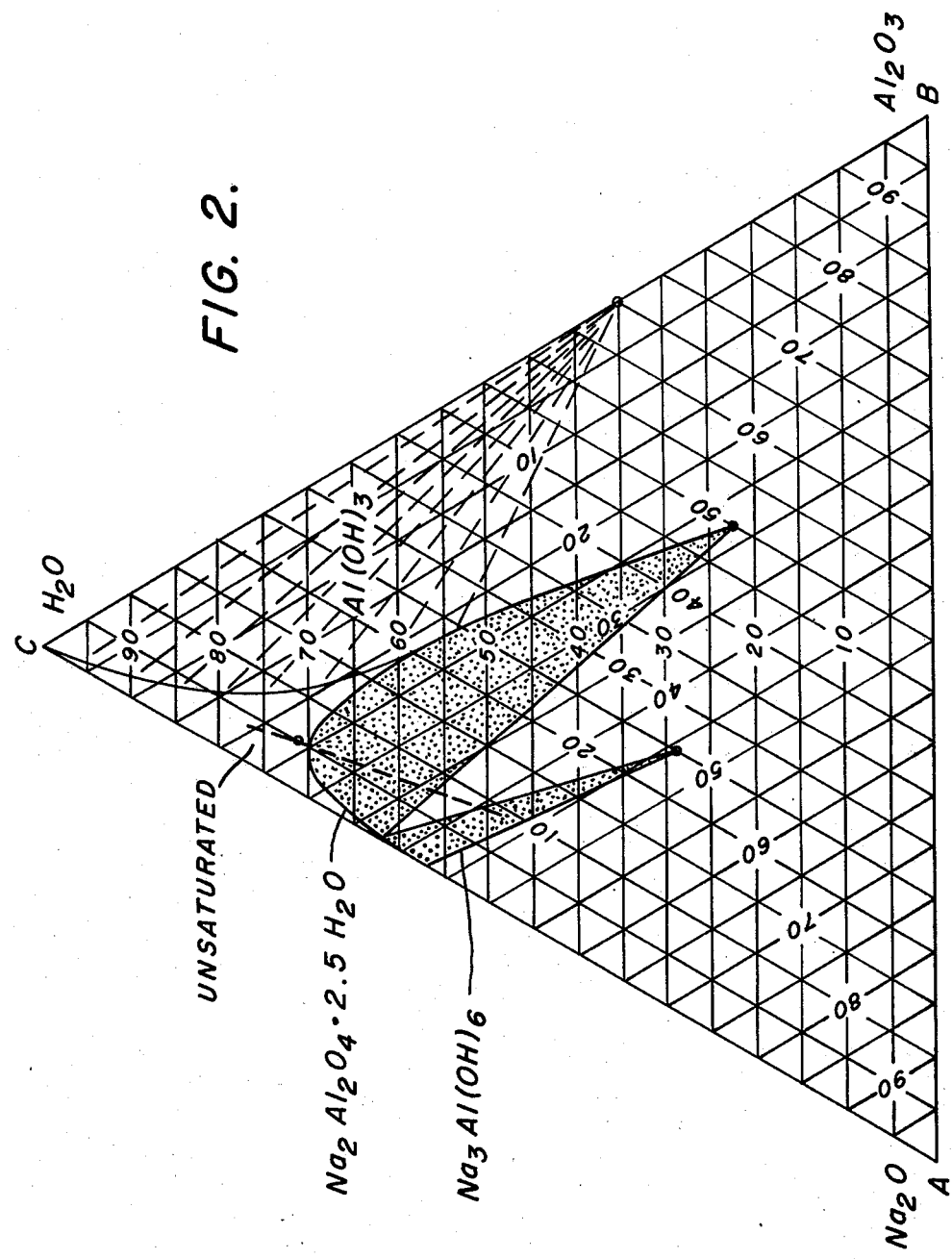

RECOVERY OF SODIUM ALUMINATE FROM HIGH-SILICA ALUMINOUS MATERIALS

CROSS-REFERENCE TO RELATED APPLICATION

This application is related to U.S. Patent application Ser. No. 623,931 "Improved Process for Recovery of Alumina from High-Silica Ore" filed concurrently on Oct. 20, 1975 in the names of Lawrence Keith Hudson, Kenneth I. Savage and John M. Stinson, Jr.

BACKGROUND OF THE INVENTION

This invention relates to extraction of alumina from aluminous material of high-silica content. More particularly, this invention relates to the processing of sodium aluminate crystals obtained from a concentrated caustic-lime digest of such aluminous materials.

The recovery of alumina from aluminous materials of high-silica content such as, for example, anorthosite, clays, shale, Bayer red mud, and the like has been successfully carried out using a digest of lime and highly concentrated caustic. However, this digest results in the formation of an aluminate solution having a very high caustic concentration and a low alumina to soda ratio. Evaporation of this digest slurry results in the crystallization of sodium aluminate having the formula $Na_2Al_2O_4 \cdot 2.5H_2O$. These crystals can then be redissolved, for example, in water or dilute caustic to provide a solution having a more acceptable alumina to soda ratio as well as a lower total caustic content from which aluminum hydroxide can be recovered by conventional means, such as the Bayer process.

Such crystals, after centrifugation or filtration, retain mother liquor having an unacceptably high caustic content. While subsequent washing of the crystals in pure water would act to lower the concentration of the caustic, it would also result in dissolution of the crystals. Since the wash liquid would be recycled to recover the caustic, such dissolution would not be desirable in view of the need to subsequently remove such added water by evaporation in other portions of the process. Ponomarev et al, in their article "The Hydro Chemical Alkali Method of Processing Nepheline Rocks" (pages 45–51 in *Tavetnye Metally*, 1957), suggest that one separates the crystals from the mother liquor by "pressing or wringing out" the liquor from the crystals. They state that by usual filtration there remains on the filter a deposit with a 1.4 to 1.8 caustic ratio (which, translated to conventional U.S. alumina to caustic expressed-as-carbonate terminology, would be 0.687 to 0.534). The same individuals in Russian Patent 108,917 state that the crystallized alkali aluminate is separated from the mother liquor without any further explanation as to how this separation is to be carried out and to what extent it is effective.

It has now been discovered that most of the high caustic mother liquor may be separated from the sodium aluminate crystals by washing while minimizing dissolution of the crystals and dilution of the liquid in the system.

SUMMARY OF THE INVENTION

In accordance with the invention, sodium aluminate crystals are obtained from a liquor prepared by digest of high-silica aluminous materials with concentrated caustic and lime, by controlled concentration of that liquor to a point where $Na_2Al_2O_4 \cdot 2.5H_2O$ is the solid phase in equilibrium with the solution and cooling the solution, while seeding to crystallize $Na_2Al_2O_4 \cdot 2.5H_2O$. After filtration or centrifugation, the mother liquor is washed from the crystals by a liquid having a higher alumina-to-soda ratio than the mother liquor and a concentration of alumina approaching saturation to inhibit dissolution of the crystals in the washed liquid.

BRIEF DESCRIPTION OF THE DRAWINGS

FIG. 2 is a three-component phase diagram illustrating the favored crystallization conditions.

DESCRIPTION OF THE PREFERRED EMBODIMENT

Figure 1:
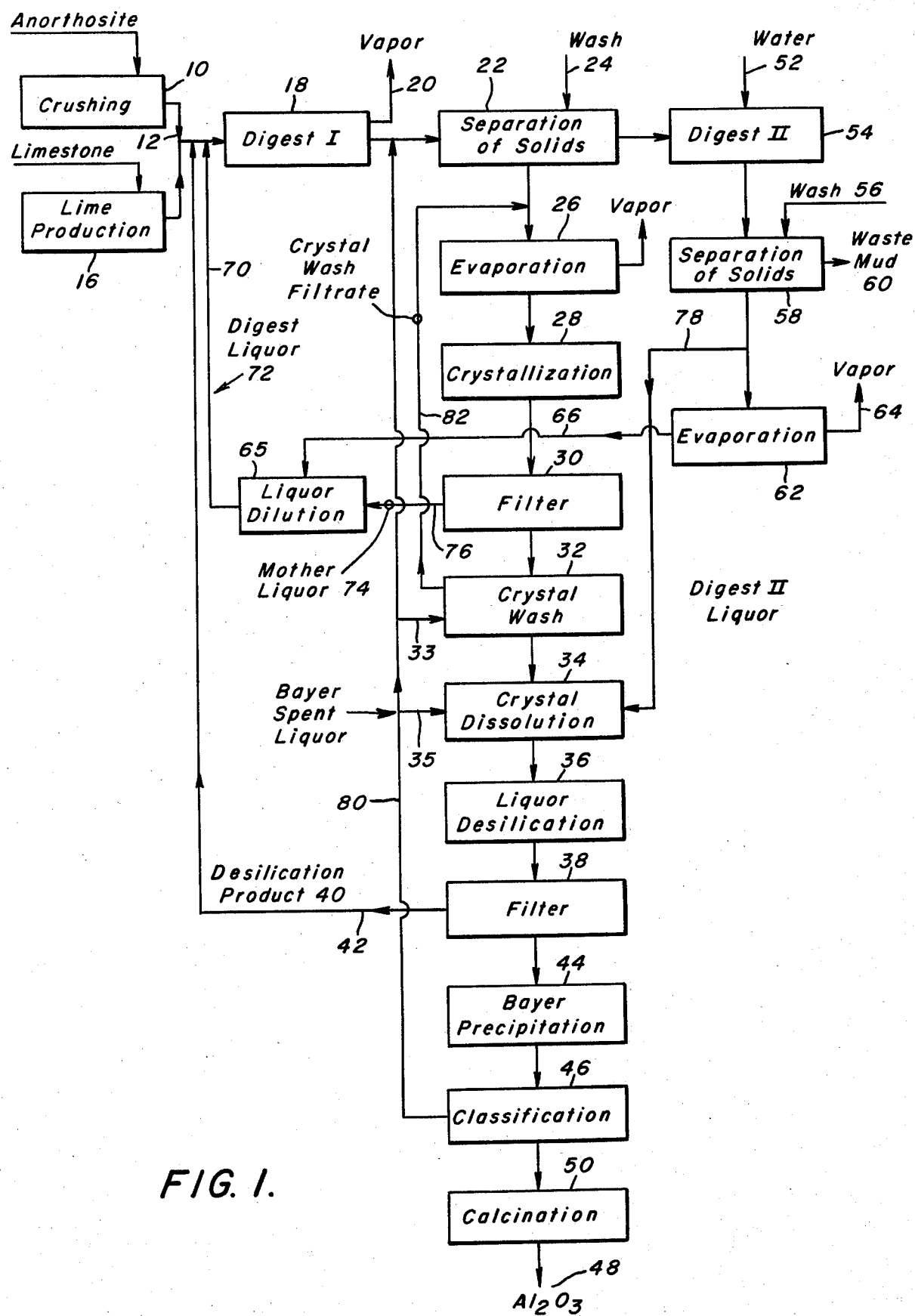
FIG. 1 is a flowsheet illustrating the process of the invention.

Referring now to FIG. 1, the overall process to which the invention relates will be described. An aluminous-bearing material such as anorthosite, after size reduction at 10, is mixed at 12 with lime produced from limestone at 16 prior to caustic digestion at 18 (Digest I). Caustic is introduced into Digest I as digest liquor 72 which comprises recycled caustic entering the digest via line 70 as will be described below. Heat exchange equipment is not shown in this schematic flow diagram, but vapors withdrawn from the solution leaving Digest I are carried via line 20 to heat the slurry coming to Digest I. Solids separated at 22 are washed at 24, the resulting solution being evaporated at 26 and hydrated sodium aluminate crystallized from it at 28 prior to filtering at 30, washing at 32 and dissolving of the crystals at 34. The resulting liquor containing the dissolved sodium aluminate is next desilicated at 36 prior to being filtered at 38, with a desilication product 40 being returned to Digest I via line 42. Alumina hydrate is then precipitated at 44 from the aluminate solution, using Bayer precipitation techniques, prior to being classified at 46 and then calcined to alumina ($Al_2O_3$) at 50.

The solids initially separated at 22 from the digest slurry from Digest I are digested with water 52 in a second digest at 54 (Digest II), with separation of solids at 58 to provide a clarified dilute caustic solution and waste mud 60. A portion of the clarified caustic solution is then evaporated at 62 with vapor being removed via line 64 and the resulting caustic-rich liquor being conducted via line 66 to a liquor dilution step 65 from which it is recycled via line 70 as digest liquor 72 to the first digestion step 18 thus providing the caustic source for Digest I as previously mentioned. The remainder of the dilute caustic liquor from the separation of solids at 58 from Digest II is conducted via line 78 for crystal dissolution step 34 as will be described in more detail below.

Portions of the Bayer spent liquor recycled from classification step 46 via line 80 can be used in the separation of solids at 22. Other portions of the Bayer spent liquor from line 80 are, in accordance with the invention, introduced into the crystal washing step via line 33 and the crystal dissolution step via line 35 as will be discussed in more detail below.

Now referring more particularly to the invention, sodium aluminate crystals having the formula $Na_2Al_2O_4 \cdot 2.5H_2O$ are formed by first evaporating at 26 the liquor from separation station 22 and recycled crystal wash filtrate 82 until the concentration (depicted along the dotted line in the phase diagram of FIG. 2) reaches a point within the shaded portion of the phase diagram identified in the drawing as $Na_2Al_2O_4 \cdot 2.5H_2O$. Evaporation beyond this region would result in crystallization of the higher soda aluminate, $Na_3Al(OH)_6$, (shown in the other shaded portion on the phase diagram) having an undesirably low alumina to soda ratio which would interfere with efficient subsequent Bayer-type processing of the aluminate liquor formed upon dissolution of the crystal cake. The solution, or liquor, is seeded with sodium aluminate crystals and then cooled to about 20°–60° C, preferably 40° C, to crystallize the alumina from solution as $Na_2Al_2O_4 \cdot 2.5H_2O$.

The crystals are then separated from the solution at 30 by filtration or centrifugation. However, an unacceptable amount of highly caustic mother liquor still clings to the crystals and must be removed prior to redissolving of the crystals to provide an acceptable alumina to caustic ratio for subsequent Bayer-type processing. The alumina to soda ratio of the pure $Na_2Al_2O_4 \cdot 2.5H_2O$ crystals is 0.962 (sodium carbonate being conventionally used to expressed $Na_2O$ concentration). The mother liquor, however, has a concentration of about 15 grams per liter $Al_2O_3$ and 983 grams per liter sodium carbonate equivalent — or a ratio of about 0.0153.

Therefore, it is necessary to wash the crystals to remove the mother liquor. However, washing with water is not acceptable due to undesirable dissolution of the crystals as well as providing further dilution of the wash solution which necessitates additional evaporation to concentrate the removed caustic prior to its recycling to Digest I.

Thus, in accordance with the invention, the crystals are washed with Bayer spent liquor (BSL) from line 80 which has a lower caustic content than the mother liquor clinging to the crystals, yet is close to saturation in alumina content thus inhibiting dissolution of the crystals. (BSL has a ratio of alumina to sodium carbonate caustic equivalent of 0.280 and an alumina content of about 50 grams per liter, i.e., considerably higher in alumina content than the mother liquor.) The washing can be carried out while monitoring the ratio of alumina to caustic in the Bayer spent liquor which will initially drop as the liquor picks up $Na_2O$ from the mother liquor on the crystals. After initially dropping, the ratio will later begin to rise signifying commencement of crystal dissolution and that the bulk of the mother liquor has been removed. The washing is then stopped with the wash liquid returned to evaporator 26 and the washed crystals passed to dissolution stage 34. Alternatively, the crystal wash filtrate may be recycled to Digest I by introducing it to liquor dilution stage 65 if the soda concentration becomes excessive from the closed loop recycling of the crystal wash filtrate back via line 82 to evaporation step 26.

The washed crystals passing to crystal dissolution step 34 are dissolved in a mixture of Bayer spent liquor from line 80 entering this stage at line 35 and a more diluted caustic liquor from line 78 which is obtained from the separation of solids at 58 emanating from Digest II. This more dilute liquor in line 78 has a total concentration of about <5 grams per liter alumina and hence a very low ratio of alumina to sodium carbonate equivalent. The sodium aluminate crystals dissolve in this mixture of liquors to form a green liquor having a ratio of alumina to sodium carbonate equivalent of about 0.630 and a caustic concentration of about 190 grams per liter, again expressed as sodium carbonate equivalent. The alumina-bearing liquor is now subjected to a desilication step at 36 followed by filtration to remove the desilication product. The liquor is then subjected to a conventional Bayer-type precipitation at 44.

The following example will serve to further illustrate the invention.

EXAMPLE I 200 grams of anorthosite ground to a particle size range of 100% by weight −65 mesh to 80% by weight +325 mesh were digested in a caustic solution having a concentration of 450 Kg of $Na_2O$ per meter$^3$ at 250° C for 30 minutes, lime being added in the amount of 1.1 moles CaO per mole of $SiO_2$.

The slurry was then blown down from digest pressure to atmospheric pressure. The slurry was then centrifuged at about 120° C to separate the alumina green liquor from the insoluble residue. The total elapsed time from blowdown to separation was about 3 minutes. Analysis of the residue following separation indicated that 95% of the alumina remained in solution. The green liquor was mixed with 480 ml of recycle streams (Bayer spent liquor and crystal wash liquor), concentrated to about 575 Kg/m$^3$ $Na_2O$, seeded with 10–30 Kg of sodium aluminate crystals per m$^3$ of green liquor, cooled at a controlled rate to 40° C, and held at 40° C for several hours to achieve a maximum yield of sodium aluminate ($Na_2Al_2O_4 \cdot 2.5H_2O$). The $Al_2O_3$ concentration was reduced from 115 to 20 Kg/m$^3$, representing removal of 84% of the $Al_2O_3$ from the liquor. Vacuum filtration was used to deliquor the crystals.

Portions of the crystals, with entrained mother liquor thereon, were then subject to respective washings with Bayer spent liquor (BSL) or water with the ratio of $Al_2O_3$/soda — expressed as carbonate in the crystals — measured before and after washing as well as the $Al_2O_3$ loss (representing crystal dissolution) also measured. The results are contained in Table I below:

TABLE I

WASHING OF SODIUM ALUMINATE CRYSTALS
COMPARISON OF BAYER SPENT LIQUOR AND WATER WASHES

| Wash Solution Used, ml/g.dry crystal | Crystal Ratio* IN | OUT | $Al_2O_3$ change (%) |
|---|---|---|---|
| BSL Wash (60° C) | | | |
| & .382 | .452 | .734 | + 2.2 |
| .540 | .450 | .744 | + 2.6 |
| .696 | .441 | .746 | + 2.0 |
| .937 | .447 | .840 | + 1.1 |
| 1.398 | .511 | .847 | − 4.9 |
| & Water Wash (22° C) | | | |
| & .238 | .510 | .726 | − 1.0 |
| .404 | .469 | .716 | − 4.2 |
| .623 | .475 | .822 | − 9.5 |
| .868 | .481 | .961 | −16.5 |
| 1.069 | .463 | .946 | −22.4 |
| 1.681 | .462 | 1.006 | −36.4 |

*Conventional Bayer Terminology ($Al_2O_3$/Soda Ratio with Soda Expressed as $Na_2CO_3$)

The crystals washed with BSL were redissolved in a mixture of 590 ml BSL and 590 ml of a dilute liquor having a total concentration of alumina of less than 5 grams per liter to make a liquor of similar concentration to Bayer green liquor. This liquor was desilicated by an atmospheric digest at 100° C for 60–90 minutes with additions of up to 12.5 Kg/m$^3$ DSP seed and up to 10 g/l $Ca(OH)_2$ for iron control. The desilication product (DSP) was removed by filtration and returned to Digest I to recover the $Al_2O_3$ and $Na_2O$. The clarified green liquor was cooled to approximately 65° C prior to precipitation of alumina hydrate. The liquor was seeded and held for the required retention time, as per conventional Bayer practice. The alumina hydrate was filtered, washed, and calcined to an alumina product. (50) grams of alumina were recovered. Chemical analysis of the anorthosite indicated this represented 93% of the alumina in the anorthosite ore.

While the invention has been described in terms of preferred embodiments, the claims appended hereto are intended to encompass all embodiments which fall within the spirit of the invention.

Having thus described our invention and certain preferred embodiments thereof, we claim:

1. In a process for extraction of alumina from highly siliceous aluminous-bearing materials by caustic and lime digest of the materials, the improvements which comprise:
    a. evaporating the digest solution until the concentration of the solution reaches the shaded portion of the phase diagram in FIG. 2 labeled $Na_2Al_2O_4 \cdot 2.5H_2O$;
    b. seeding the evaporated solution with $Na_2Al_2O_4 \cdot 2.5H_2O$ crystals and cooling to crystallize alumina from the solution as $Na_2Al_2O_4 \cdot 2.5H_2O$;
    c. separating the $Na_2Al_2O_4 \cdot 2.5H_2O$ crystals from the resultant mother liquor solution; and
    d. washing the $Na_2Al_2O_4 \cdot 2.5H_2O$ crystals with a caustic liquid having a lower caustic content than the mother liquor and an alumina concentration of about 50 grams per liter to remove any mother liquor remaining on said crystals.

2. The process of claim 1 wherein said wash liquid has a ratio of alumina to sodium carbonate caustic equivalent of 0.280.

3. The process of claim 1 wherein said solution is cooled to a temperature of 20°-60° C after seeding.

4. The process of claim 3 wherein said temperature is about 40° C.

5. In a process for extraction of alumina from highly siliceous aluminous-bearing materials by caustic and lime digest of the materials and recovery of sodium aluminate crystals from the digest slurry, the improvement comprising:
    a. evaporating the digest solution until the concentration of the solution reaches the shaded portion of the phase diagram in FIG. 2 labeled $Na_2Al_2O_4 \cdot 2.5H_2O$;
    b. seeding the evaporated solution with $Na_2Al_2O_4 \cdot 2.5H_2O$ crystals to crystallize alumina from the solution as $Na_2Al_2O_4 \cdot 2.5H_2O$;
    c. cooling the evaporated solution to a temperature of 20°-60° C;
    d. separating the sodium aluminate crystals from the resultant highly caustic mother liquor; and
    e. washing the crystals with a liquor having a sufficiently lower caustic concentration and higher alumina to caustic ratio than the mother liquor to remove any mother liquor remaining on said crystals while minimizing dissolution of the crystals.

* * * * *